(No Model.) 2 Sheets—Sheet 1.
W. W. GRISCOM.
SECONDARY BATTERY.
No. 401,744. Patented Apr. 23, 1889.
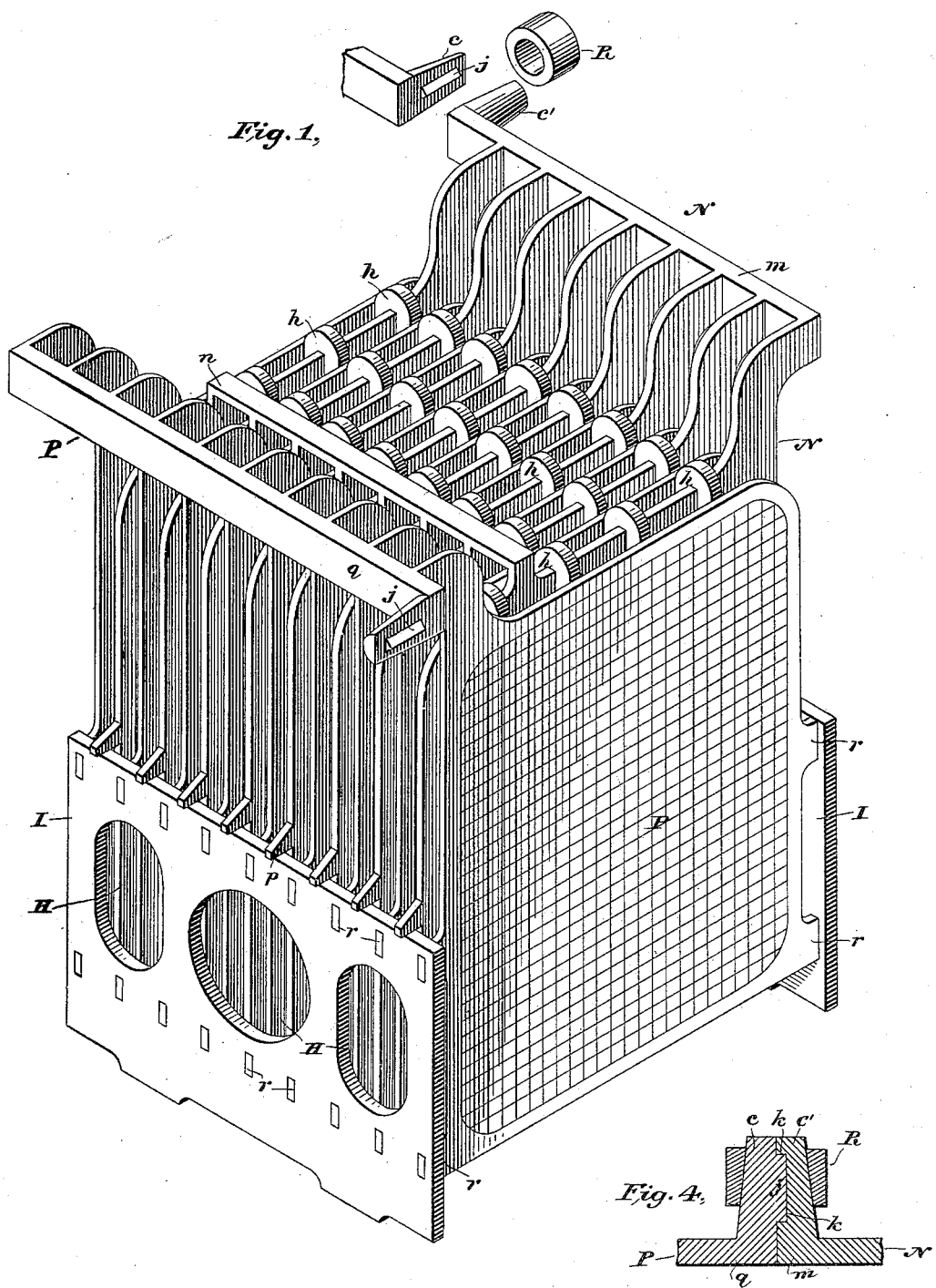
Witnesses,
Geo. W. Breck
Edward Thorpe
William W. Griscom, Inventor,
By his Attorney Wm. B. Vansize

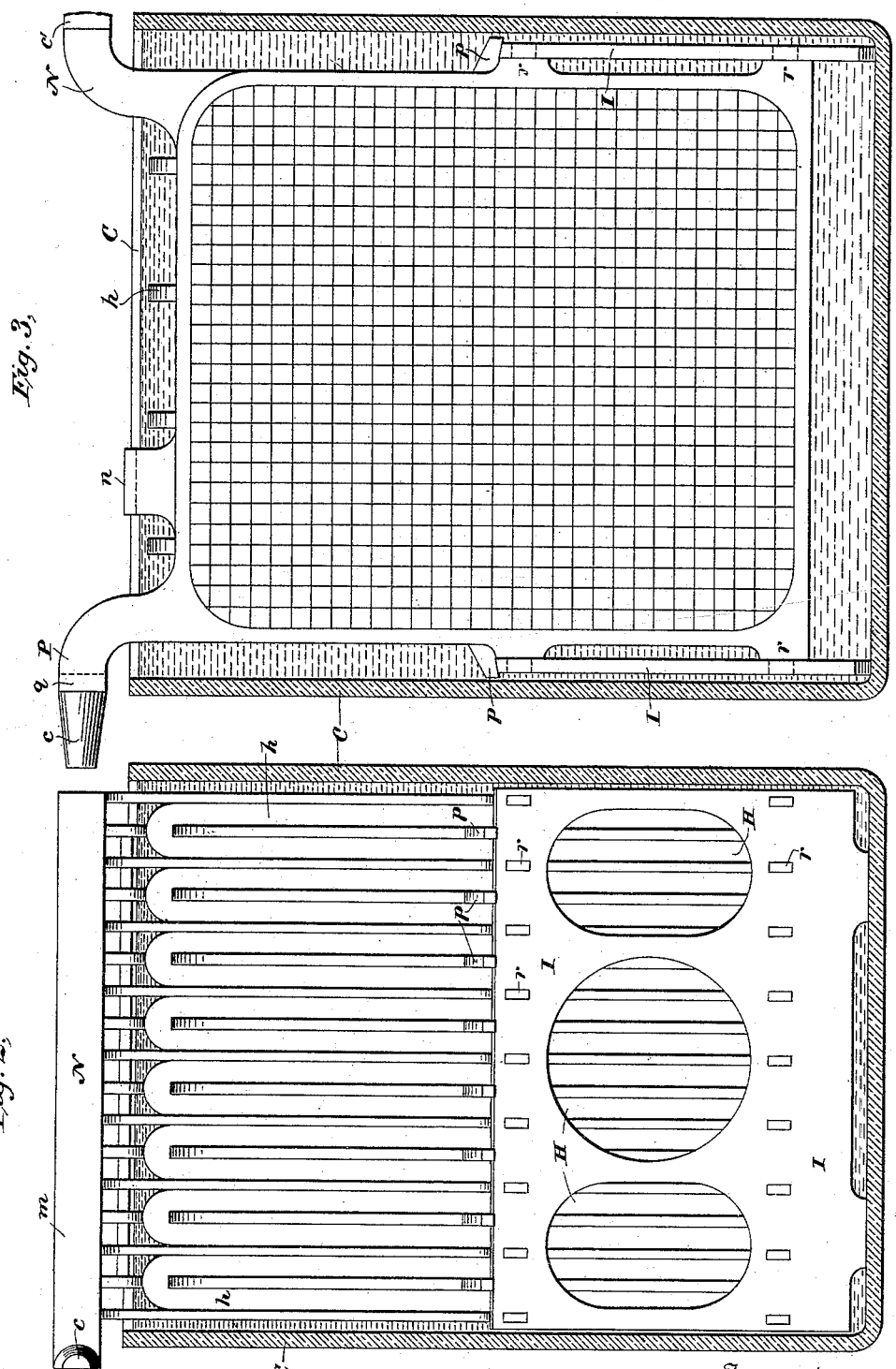

UNITED STATES PATENT OFFICE.

WILLIAM W. GRISCOM, OF HAVERFORD COLLEGE, PENNSYLVANIA, ASSIGNOR TO THE ELECTRICAL ACCUMULATOR COMPANY, OF NEW YORK.

SECONDARY BATTERY.

SPECIFICATION forming part of Letters Patent No. 401,744, dated April 23, 1889.

Application filed February 1, 1889. Serial No. 298,336. (No model.)

*To all whom it may concern:*

Be it known that I, WILLIAM W. GRISCOM, a citizen of the United States, and a resident of Haverford College, in the county of Montgomery and State of Pennsylvania, have invented certain new and useful Improvements in Secondary Batteries, of which the following is a specification.

My invention is an improvement in secondary batteries or accumulators.

The invention more particularly has reference to the arrangement of the plates in the cell, whereby they are supported free from the bottom of the cell in a manner which facilitates the removal of one element without disturbing the other and retains the plates at a uniform distance from each other.

I have also devised an improved form of connection for uniting adjacent cells of battery, which I prefer to construct of a practically inoxidizable metal. Heretofore others have united the several plates forming one element of a pair by strips of metal fixed upon opposite edges near the central height of the plates and have provided the plates of the complementary element with projections upon opposite edges, designed to rest upon and be supported by the strips of the first element. I have found this arrangement susceptible of improvement, because the weight of both elements is thus thrown upon the lower section of one series of plates, causing, or tending to cause, a curvature between the lower edge and the central line of said plates.

My improvement is designed to obviate this difficulty; and it consists in fixing a board, sheet, or strip of insulating material to opposite edges of the plates forming one element. This board, sheet, or strip extends about half the vertical distance of the plates. The plates composing the second or complementary element have projections upon opposite edges resting upon the insulating-boards. The plates of one element are interleaved with those of the other, and are insulated therefrom by the use of the well-known hair-pin separators.

My improved form of connector for electrically uniting two adjacent cells is in the form of a truncated cone divided on the plane of its major axis, one-half forming a part of each cell. On the plane surface of one section I place an angular projection and in the plane surface of the other half an angular depression of the same size and formation as the projection of the first half, so that in bringing the two sections of the cone together the projection of one half entering the depression in the other produces a perfect figure without abrupt interruption in the surface. A ring is then forced down upon the cone, and the resulting friction unites the two divisions in a substantially perfect electrical contact.

The accompanying drawings illustrate my invention.

Figure 1 is a complete view of the two elements of the battery in their proper relative position, showing the form of connection employed. Figs. 2 and 3 are vertical sectional views of a cell on planes at right angles with each other. Fig. 4 is a vertical section of the form of connection employed.

In Fig. 1 P is a single element composed of a series of similar plates. The plates of both elements preferably consist of a lead casting having a series of uniformly-arranged perforations, in and to which is applied an active material containing an oxide of lead. On opposite edges of the series of plates constituting element P there are a series of square projections, $r$.

I is a board, sheet, or strip of insulating material, as hard rubber. The vertical height of this board is about one-half the vertical height of the plates. Near its upper edge and near its lower edge there are a series of equidistant perforations in outline similar to the outline of the projections or rivets $r$, forming part of the described plates. These projections are made to enter the perforations in the board I and are then riveted firmly in position. The relative position of the projections on the plates with respect to the perforations in the board of insulating material is such that when in position the plates are somewhat elevated from the bottom of the cell, while the lower edges of the boards rest upon the bottom.

N is a complementary element, likewise composed of a series of plates, each plate being provided upon its opposite edges, near its central vertical distance, with projections $p$, which rest upon the board of insulating material, I, supporting the element N, somewhat elevated from the bottom of the cell and in such position that the upper and lower edges of the plates of both elements are in substantially the same horizontal plane. The plates composing the element N are mechanically and electrically united by horizontal strips $m$ and $n$. The plates composing the element P are electrically united by the horizontal strip $q$, and are mechanically united and maintained equidistant by the rivets or projections entering the boards of insulating material, I. These boards of insulating material, I, are perforated with two or three large holes for the purpose of facilitating inspection. The plates N and P are interleaved, and are separated electrically by a series of hair-pins, $h$, of insulating material.

C is an inclosing-cell containing an electrolytic liquid. The connection for electrically uniting two adjacent cells is shown in Figs. 1 and 4. Each lug $m$ or $q$ terminates in a connection preferably consisting of an alloy of lead and antimony having the form or outline of half a truncated cone, $c$ or $c'$. The plane surface of each section $c$ contains an angular projection, $j$. The corresponding surface of each section $c'$ contains an angular depression having a similar outline to the projections on the section $c$. When two cells are brought together, the projection on $c$ is placed into the depression in $c'$, causing an accurate registry of the two sections to form a regular geometrical figure. After the sections are brought together, as described, a ring, R, is forced onto the cone with a screw movement, and the resulting frictional contact maintains it in position and produces substantially perfect electrical connection.

This construction furnishes a battery which is mechanically superior to anything heretofore known, so far as my observation has extended. The deflection of the plates by unequal chemical action is rendered remote or impossible by mechanically supporting them at a uniform distance from each other. The interleaved plates are also maintained at a uniform distance by the mechanical connection between the plates of the first element and the separators of insulating material.

What I claim, and desire to secure by Letters Patent, is—

1. In a secondary battery, the combination of two elements or electrodes, an inclosing-cell therefor, an electrolytic liquid, and means for supporting both electrodes, consisting of boards or strips of insulating material mechanically connecting and fixed to the plates of one element at points upon opposite edges, forming a support, substantially as described.

2. In a secondary battery, the combination of two elements or electrodes, an inclosing-cell therefor, an electrolytic liquid, boards or strips of insulating material to which the plates of one element are fastened, and a series of projections on the second element resting upon said strip, whereby both elements are supported free from contact with the cell-bottom, substantially as described.

3. In a secondary battery, the combination of two elements or electrodes, an inclosing-cell therefor, an electrolytic liquid, and boards or strips of insulating material to which the opposite edges of the plates of one element are respectively riveted, forming a support for the projections on the second element, whereby both elements are supported free from contact with the cell-bottom.

4. An electrical connector for batteries, consisting of two sections of conducting material, each forming part of a cone or cylinder having a smooth surface, respectively connected to the terminals of two battery-elements, and a clamp or ring for uniting the two sections mechanically.

5. An electrical connector for batteries, consisting of two sections of conducting material, each forming part of a cone or cylinder having a smooth curved surface, said sections being respectively connected to two battery-elements, and a ring having an interior wall conforming to said curved surface for uniting the two sections mechanically and electrically, substantially as described.

6. An electrical connector for uniting two cells of battery, consisting of two complementary sections of conducting material connected respectively to two battery-elements and united to form a cone or cylinder having a smooth surface, guides upon the meeting surfaces to produce accurate registry, and a suitable device for clamping or holding the sections together.

WILLIAM W. GRISCOM.

Witnesses:
V. E. SCHAUMBURG,
FRANKLIN D. L. WALKER.